Patented Aug. 8, 1933

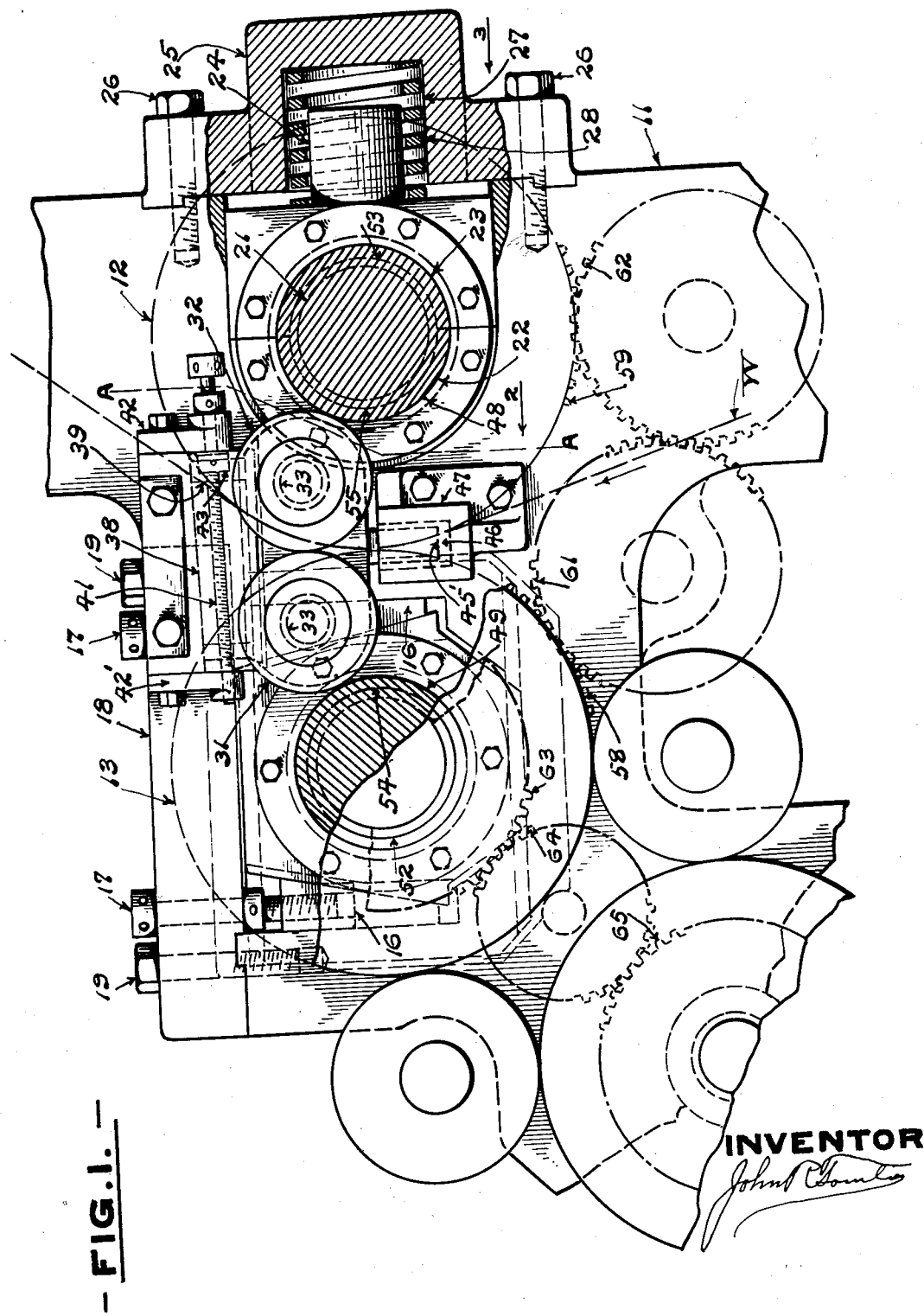

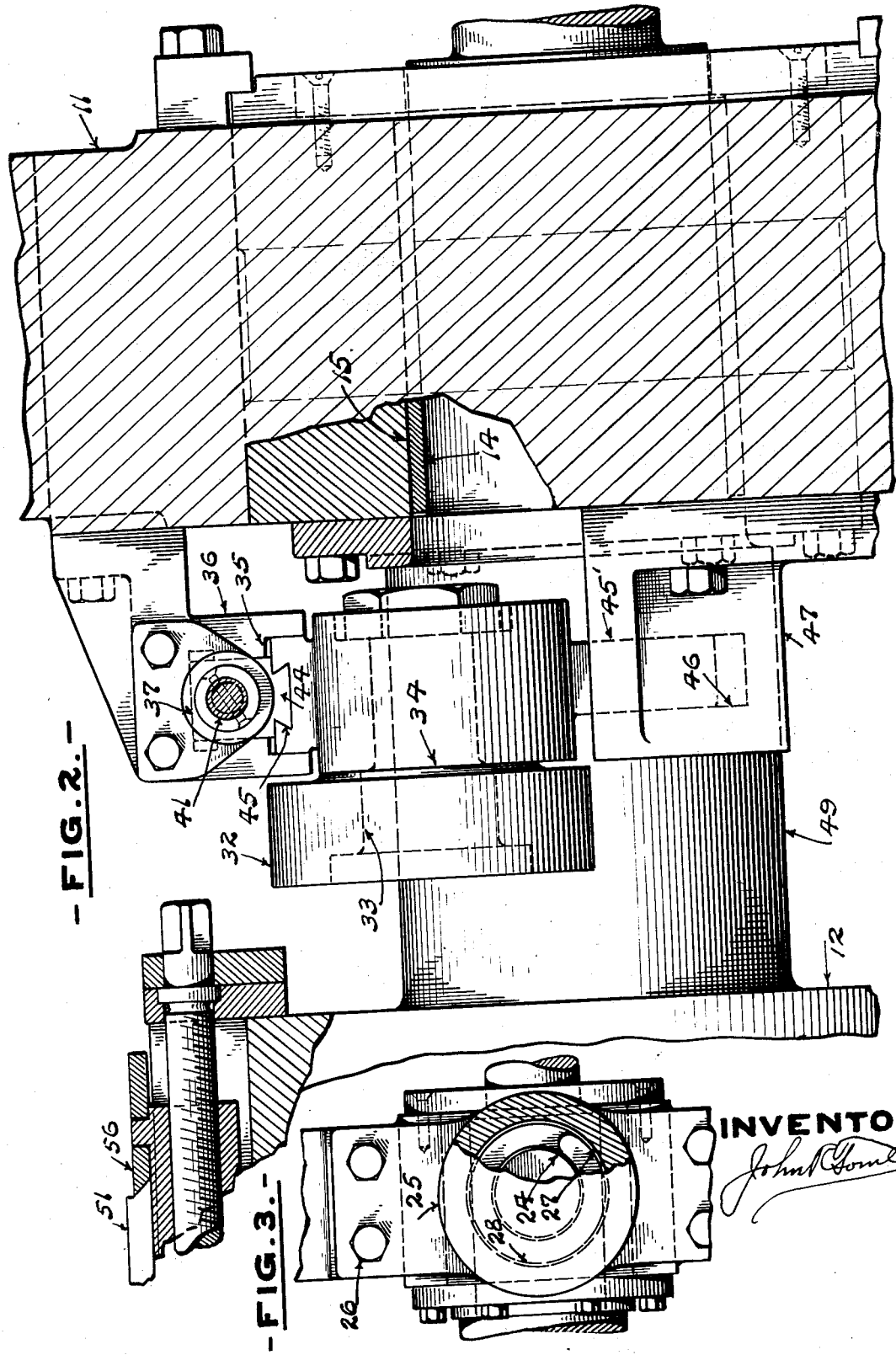

1,921,443

UNITED STATES PATENT OFFICE 1,921,443

BEARING FOR ROTARY PRINTING MACHINES

John R. Tomlin, Brooklyn, N. Y., assignor to R. Hoe & Co., Inc., New York, N. Y., a Corporation of New York; Irving Trust Company, Receiver Application March 4, 1930. Serial No. 432,996

5 Claims. (Cl. 101—219)

This invention relates to rotary printing machines wherein the material to be printed is passed between an impression cylinder and a form cylinder to which printing plates are secured.

In the usual arrangement for supporting the cylinder bearings of these machines, the bearings are rigidly secured in heavy side frames and should a plate become dislodged from its proper place on the cylinder and shift so as to overlap another plate, a severe strain would be imposed on the bearings and on the frame structure, and in many cases it would result in great damage to the machine.

In order to obtain good printing, a relatively heavy "impression" or pressure is required between the cylinders, and it is common practice to provide means to adjust the position of the bearings for one of the cylinders, in order to obtain the amount of pressure required.

The arrangement of plates on the form cylinder is frequently such that the margin spaces between certain plates are aligned lengthwise of the cylinder and when these gaps pass the point where the plates normally engage with the impression cylinder all pressure between the cylinders is relieved.

In all bearings, there is a certain amount of freedom or play. When the bearings of a pair of printing cylinders are adjusted to provide the desired pressure against the plates, the journals of the cylinders are forced against the outer sides of the bearings, but when the cylinders are rotated to a point where the gaps between plates are presented to the impression cylinder, in printing machines as usually constructed, the pressure between the cylinders being removed, they move toward each other in order to relieve the pressure on the journal bearings, and this motion continues until the cylinders move to the extent permitted by the play in the bearings, and the journals strike the inner sides of the bearings. This action sets up an undesirable vibration in the machine and also damages the edges of the plates on both sides of the gaps.

The invention herein disclosed provides means for allowing one of the bearings to recede in the case of any occurrence that causes an excessive strain to be imposed on them and thus avoid damage to the machine. Furthermore, means are provided for holding the cylinder journals against the outer side of their bearings and thus prevent the cylinders from approaching each other when the gaps between the plates are passing the point of engagement with the impression cylinder.

An object of the invention is to provide an arrangement of journal bearings for a printing couple that will automatically separate in the event that excessive pressure is produced between them.

Another object of the invention is to provide an arrangement of journal bearings for a printing couple that will normally hold the journals against the outer side of their bearing boxes and prevent the cylinders from approaching each other when the impression pressure is removed.

It is also an object of the invention to provide an arrangement of journal bearings of generally improved construction, whereby the mechanism will be simple, durable and inexpensive in construction, as well as convenient, practical, serviceable and efficient in its use.

With the foregoing and other objects in view, which will appear as the description proceeds, the invention resides in the combination and arrangement of parts, and in the details of construction hereinafter described and claimed, it being understood that various changes in the precise embodiment of the invention herein disclosed may be made within the scope of what is claimed without departing from the spirit of the invention.

The preferred embodiment of the invention is illustrated in the accompanying drawings, wherein:

Figure 1 is a sectional view of a portion of a rotary web printing machine showing a printing couple with the journal bearings and coacting mechanism arranged in accordance with the invention;

Figure 2 is a vertical sectional view showing one of the printing cylinders and coacting mechanism as seen on the line A—A of Figure 1 and in the direction of arrow 2; and Figure 3 is a fragmentary view partly in section, of a portion of the printing machine frame as viewed in the direction of arrow 3 of Figure 1.

In the drawings, a printing machine frame is indicated by the numeral 11, and a printing couple is shown, comprising an impression cylinder 12, and a form cylinder 13, which may be driven by any convenient means. The cylinder 13 is provided with journals, one of which is shown in Figure 2 and indicated at 14. Journal bearings 15, rotatably support the cylinder 13 and are provided with adjusting mechanism comprising wedges 16, and adjusting screws 17, which are screw threaded into the wedges 16 and by means of which they can be raised or lowered with reference to the bearing cap 18, that is secured to the frame 11 by means of bolts 19. It will be understood that by turning the screws 17 to raise one of the wedges and lower the other one, that the cylinder 13 may be moved toward or away from the cylinder 12 and thus vary the pressure on the web W that is passed between them to be printed.

The cylinder 12 is similarly provided with journals 21, and a journal bearing of a divided type is preferably used. The portion 22 of the bearing is fixed to the frame 11, and the portion or block 23 is arranged to slide in an opening in the frame 11. The bearing block 23, is formed with a cylindrical portion 24. A bearing cap 25, is provided and secured to the frame 11 by bolts 26, and the cap bored as indicated at 27, to receive a spring 28, that bears against the bearing block 23.

Rollers 31 and 32 may be rotatably supported on studs 33 that are secured to a roller support 34, fitted to slide vertically in the channel 35, formed in the block 36, which has a second channel 37, with an inclined inner surface 38, that is engaged by a similarly inclined wedge shaped block 39, adapted to receive an adjusting screw 41, that turns freely in the brackets 42 and 42', and is provided with thrust collars 43. The under side of the wedge 39, is provided with a dovetail tongue 44, that is fitted to a similarly shaped groove 45, in the roller support 34.

The roller support 34, is provided with an arm 45', that is fitted to slide in an elongated chamber 46, formed in the bracket 47, that is secured to the frame 11, and the chamber is arranged to permit motion of the roller support 34, to the right or left as shown in Figure 1. Although not shown, mechanism the same as that described is provided for the journal bearings for the opposite ends of the cylinders.

As shown in Figure 1, rollers 31 and 32 are so mounted as to run in contact with each other. They also engage roller ways 48 and 49, formed concentric with the axes of the printing cylinders 12 and 13 respectively. It will be understood that by turning the screw 41, the wedge 39 will be moved toward the left or toward the right as shown in Figure 1, and the roller support 34 will coincidently be lowered or raised. It will be seen that when the wedge 39, is pressed to the left that the downward pressure will be exerted on the roller support, and the rollers caused to exert a pressure tending to increase the distance between the axes of the printing cylinders, the journals of which will thus be held against the outer sides of their bearing boxes.

When the journal bearings for the printing cylinders are adjusted to bring the cylinders into the relation required to produce the correct printing pressure between the plates 51 on the form cylinder and the impression cylinder 12, the bearings will press against the outer sides of the journals at the points indicated by the numerals 52 and 53, and any freedom or play that there may be in the bearings will produce gaps between the inner sides of the journals and the adjacent portions of the bearings at the points 54 and 55, but when the form cylinder in rotating, brings the margin space between pages to the engaging point or bite of the cylinders and there is no plate pressing against the impression cylinder, pressure on the bearings at the points 52 and 53, will then be relieved and they would move toward each other, were it not that the rollers 31 and 32 act to hold the journals into engagement with the outer sides of the bearings and thus prevent the journals from moving into the gaps and causing undesirable vibrations in the machine.

The elongated bore 46, permits a certain amount of sidewise movement of the roller support 34, thus allowing it to equalize the pressure between each of the rollers and the roller way which it engages. The form cylinder 13, is provided with a well known arrangement of plate clamps 56, holding the plates 51 in position and the cylinder shafts are extended beyond the journals as shown at 57, to carry gears 58 and 59, and it will be understood that they mesh with idler gears 61 and 62 by means of which the cylinders are made to rotate in synchronism. The gear 63 is also secured to the shaft of the form cylinder 13 and meshes with the idler 64 which meshes with gear 65 on the ink cylinder of a well known form of inking mechanism.

What I claim is:

1. In a rotary printing machine, a printing couple comprising a form cylinder and an impression cylinder, journals on the cylinders, bearings for the journals, roller ways on the cylinders concentric with their axes, and rollers arranged to bear against each other and against the roller ways and thereby hold the journals against the outer sides of the bearings.

2. In a rotary printing machine, a printing couple comprising a form cylinder and an impression cylinder, journals on the cylinders, bearings for the journals, roller ways on the cylinders concentric with their axes, rollers arranged to bear against the roller ways to hold the journals against the outer sides of the bearings, and means to permit the bearings to separate when the pressure between the cylinders is excessive.

3. In a rotary printing machine, a printing couple comprising a form cylinder and an impression cylinder, journals on the cylinders, bearings for the journals, roller ways on the cylinders concentric with their axes, rollers arranged to bear against the roller ways, thereby holding the journals against the outer sides of the bearings, means for adjusting the bearings of one of the cylinders to vary the normal pressure between the cylinders, and means to permit the bearings to separate when the pressure is excessive.

4. In a rotary printing machine, a printing couple comprising a form cylinder and an impression cylinder, journals for the cylinders, journal bearings adapted to maintain pressure between the cylinders, and means to impose a pressure on the bearings independently of the reaction due to the pressure between the cylinders and substantially in the direction of said reaction; said means including roller ways on the cylinders concentric with their axes, and pairs of rollers arranged to bear against each other and against the roller ways.

5. In a rotary printing machine, a printing couple comprising a form cylinder and an impression cylinder, journals on the cylinders, journal bearings adapted to maintain pressure between the cylinders by pressing on the journals, and means to impose a pressure on the journals tending to separate the cylinders, in addition to that required to maintain impression pressure between the cylinders; said means including roller ways on the cylinders concentric with their axes, and pairs of rollers arranged to bear against each other and against the roller ways.

JOHN R. TOMLIN.